US011699932B2

(12) United States Patent
Tanaka

(10) Patent No.: US 11,699,932 B2
(45) Date of Patent: Jul. 11, 2023

(54) ROTOR FOR ROTARY ELECTRIC MACHINE

(71) Applicant: HONDA MOTOR CO., LTD., Tokyo (JP)

(72) Inventor: Shuhei Tanaka, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 84 days.

(21) Appl. No.: 17/514,205

(22) Filed: Oct. 29, 2021

(65) Prior Publication Data

US 2022/0140676 A1 May 5, 2022

(30) Foreign Application Priority Data

Nov. 2, 2020 (JP) .................................. 2020-183931

(51) Int. Cl.
*H02K 1/27* (2022.01)
*H02K 1/278* (2022.01)
*H02K 15/03* (2006.01)

(52) U.S. Cl.
CPC ............. *H02K 1/278* (2013.01); *H02K 15/03* (2013.01)

(58) Field of Classification Search
CPC .......... H02K 1/27; H02K 1/2706; H02K 1/32; H02K 1/22; H02K 9/00; H02K 9/19; H02K 21/12; H02K 2209/00
USPC .................................................... 310/156.01
See application file for complete search history.

(56) References Cited

U.S. PATENT DOCUMENTS

| 7,911,091 | B2 * | 3/2011 | Takenaka ............... H02K 9/197 310/58 |
| 8,760,025 | B2 * | 6/2014 | Rahman ............... H02K 1/2766 310/156.53 |
| 9,660,489 | B2 * | 5/2017 | Muniz ...................... H02K 1/32 |
| 10,270,324 | B2 * | 4/2019 | Sidiropoulos ........... B60K 6/26 |
| 2009/0261667 | A1 * | 10/2009 | Matsubara ........... H02K 1/2766 310/54 |

(Continued)

FOREIGN PATENT DOCUMENTS

| CN | 108847731 A | * 11/2018 | ........... H02K 1/2766 |
| JP | 2006314152 A | * 11/2006 | |

(Continued)

*Primary Examiner* — Ahmed Elnakib
*Assistant Examiner* — Masoud Vaziri
(74) *Attorney, Agent, or Firm* — Paratus Law Group, PLLC

(57) ABSTRACT

A rotor for a rotary electric machine includes a rotor core in which a plurality of magnetic pole portions is provided. Each of the magnetic pole portions includes: a magnet insertion hole into which a permanent magnet is inserted. A d-axis-side space portion is provided inside the magnet insertion hole between the d-axis-side end portion of the permanent magnet and the d-axis-side end portion of the magnet insertion hole, and a q-axis-side space portion penetrating in the axial direction is provided inside the magnet insertion hole between the q-axis-side end portion of the permanent magnet and the q-axis-side end portion of the magnet insertion hole. The permanent magnet further includes: a first communication portion communicating the d-axis-side end portion with the q-axis-side end portion; and a second communication portion communicating the d-axis-side end portion with the q-axis-side end portion.

5 Claims, 3 Drawing Sheets

(56) References Cited

U.S. PATENT DOCUMENTS

| | | | | |
|---|---|---|---|---|
| 2015/0381015 A1* | 12/2015 | Hattori | ............... | H02K 1/32 |
| | | | | 310/59 |
| 2016/0359384 A1* | 12/2016 | Okamoto | ............... | H02K 1/276 |
| 2017/0033624 A1* | 2/2017 | Kikuchi | ............... | B60L 15/007 |
| 2020/0136451 A1* | 4/2020 | Zeichfussl | ............... | F03D 9/25 |
| 2020/0259377 A1* | 8/2020 | Gangi | ............... | H02K 1/2766 |
| 2020/0287432 A1* | 9/2020 | Tanaka | ............... | H02K 1/28 |

FOREIGN PATENT DOCUMENTS

| | | | | |
|---|---|---|---|---|
| JP | 2007104888 A | * | 4/2007 | ............ H02K 1/2766 |
| JP | 2013-201853 A | | 10/2013 | |
| JP | 2013201853 A | * | 10/2013 | ............ H02K 1/278 |
| WO | WO-2020067347 A1 | * | 4/2020 | |

\* cited by examiner

ROTOR FOR ROTARY ELECTRIC MACHINE

CROSS REFERENCE TO RELATED APPLICATIONS

This application claims priority to Japanese Patent Application No. 2020-183931 filed on Nov. 2, 2020, the content of which is incorporated herein by reference.

TECHNICAL FIELD

The present invention relates to a rotor for a rotary electric machine mounted on an electric vehicle or the like, and more particularly, to a rotor for a rotary electric machine in which a plurality of magnetic pole portions are formed in a rotor core at predetermined intervals in a circumferential direction.

BACKGROUND ART

In related art, electric vehicles such as hybrid vehicles, battery-driven vehicles, and fuel cell vehicles are equipped with rotary electric machines such as motors and generators. As for the rotary electric machines to be mounted on the electric vehicles, in recent years, the rotary electric machines to be mounted on the electric vehicles tend to have increased torque and increased output.

There has been known a so-called interior permanent magnet (IPM) type rotary electric machine using, as a rotor used in a rotary electric machine, a rotor in which a plurality of magnetic pole portions are formed in a rotor core at predetermined intervals in a circumferential direction while a permanent magnet of each magnetic pole portion is inserted into a magnet insertion hole provided in the rotor core.

In the IPM type rotary electric machine, heat generation of the permanent magnet is increased as a rotation speed increases. Meanwhile, when a temperature of the permanent magnet becomes excessively high due to the heat generation, demagnetization or the like occurs in the permanent magnet, and thus output performance of the rotary electric machine is deteriorated. Therefore, it is required to cool the permanent magnet more effectively in the rotary electric machine.

Therefore, for example, JP 2013-201853 A discloses a rotor of a so-called surface permanent magnet (SPM) type rotary electric machine in which a permanent magnet is fixed to an outer surface of a rotor core, the rotor being formed with an axial through hole between a pedestal where the permanent magnet is attached and the permanent magnet. According to the rotor for a rotary electric machine disclosed in JP 2013-201853 A, the permanent magnet can be cooled by a coolant passing through the axial through hole formed in the pedestal and the permanent magnet.

However, in the case of the IPM type rotary electric machine, the permanent magnet is more likely to generate heat at a portion located on a radially outer side of the rotor. According to the rotor for a rotary electric machine disclosed in JP 2013-201853 A, although a radially inner region of the permanent magnet is cooled by the coolant passing through the axial through hole, it is difficult to effectively cool a radially outer region, which is most likely to generates heat, of the permanent magnet.

An aspect of the present invention provides a rotor for a rotary electric machine capable of effectively cooling a radially outer region, which is most likely to generate heat, of a permanent magnet.

SUMMARY OF INVENTION

A rotor for a rotary electric machine according to an aspect of the present invention includes: a rotor core having a substantially annular shape in which a plurality of magnetic pole portions is provided at predetermined intervals in a circumferential direction. Each of the magnetic pole portions includes: at least one magnet insertion hole that penetrates the rotor core in an axial direction, a permanent magnet that is inserted into the magnet insertion hole, a central axis referred to as a d-axis, and an axis referred to as a q-axis that is separated from the d-axis by an electric angle of 90 degrees. When viewed from the axial direction, the magnet insertion hole is formed on a side of the magnetic pole portion in the circumferential direction relative to the d-axis, extends in the circumferential direction as going radially outward from the d-axis to the q-axis, and includes: an outer-diameter-side wall surface extending in the circumferential direction; an inner-diameter-side wall surface extending in the circumferential direction so as to face the outer-diameter-side wall surface from a radially inner side; a d-axis-side end portion connecting the outer-diameter-side wall surface and the inner-diameter-side wall surface at an end portion on the d-axis side in the circumferential direction; and a q-axis-side end portion connecting the outer-diameter-side wall surface and the inner-diameter-side wall surface at an end portion on the q-axis side in the circumferential direction. The permanent magnet includes: an outer-diameter-side end surface facing the outer-diameter-side wall surface of the magnet insertion hole and extending in the circumferential direction inside the magnet insertion hole; an inner-diameter-side end surface facing the inner-diameter-side wall surface of the magnet insertion hole and extending in the circumferential direction inside the magnet insertion hole; a d-axis-side end portion connecting the outer-diameter-side end surface and the inner-diameter-side end surface at an end portion on the d-axis side in the circumferential direction; and a q-axis-side end portion connecting the outer-diameter-side end surface and the inner-diameter-side end surface at an end portion on the q-axis side in the circumferential direction. A d-axis-side space portion penetrating in the axial direction is provided inside the magnet insertion hole between the d-axis-side end portion of the permanent magnet and the d-axis-side end portion of the magnet insertion hole, and a q-axis-side space portion penetrating in the axial direction is provided inside the magnet insertion hole between the q-axis-side end portion of the permanent magnet and the q-axis-side end portion of the magnet insertion hole. The permanent magnet further includes: a first communication portion provided at a predetermined distance from a first end portion on one side in the axial direction toward a center in the axial direction, the first communication portion being configured to communicate the d-axis-side end portion with the q-axis-side end portion; and a second communication portion provided at a predetermined distance from a second end portion on the other side in the axial direction toward the center in the axial direction, the second communication portion being configured to communicate the d-axis-side end portion with the q-axis-side end portion. The d-axis-side space portion includes: a first opening portion opened in a first end surface on the one side in the axial direction of the rotor core; and a second opening portion opened in a second end surface on the other side in the axial direction of the rotor core. A coolant is introduced from the first opening portion of the d-ax is-side space portion into the d-axis-side space portion, at least a part of the coolant is supplied to the q-axis-side space portion through the first communication portion to flow to the other side in the axial direction, supplied again to the d-axis-side space portion through the second communication portion, and discharged from the second opening portion of the d-axis-side space portion.

DESCRIPTION OF EMBODIMENTS

Figure 1:
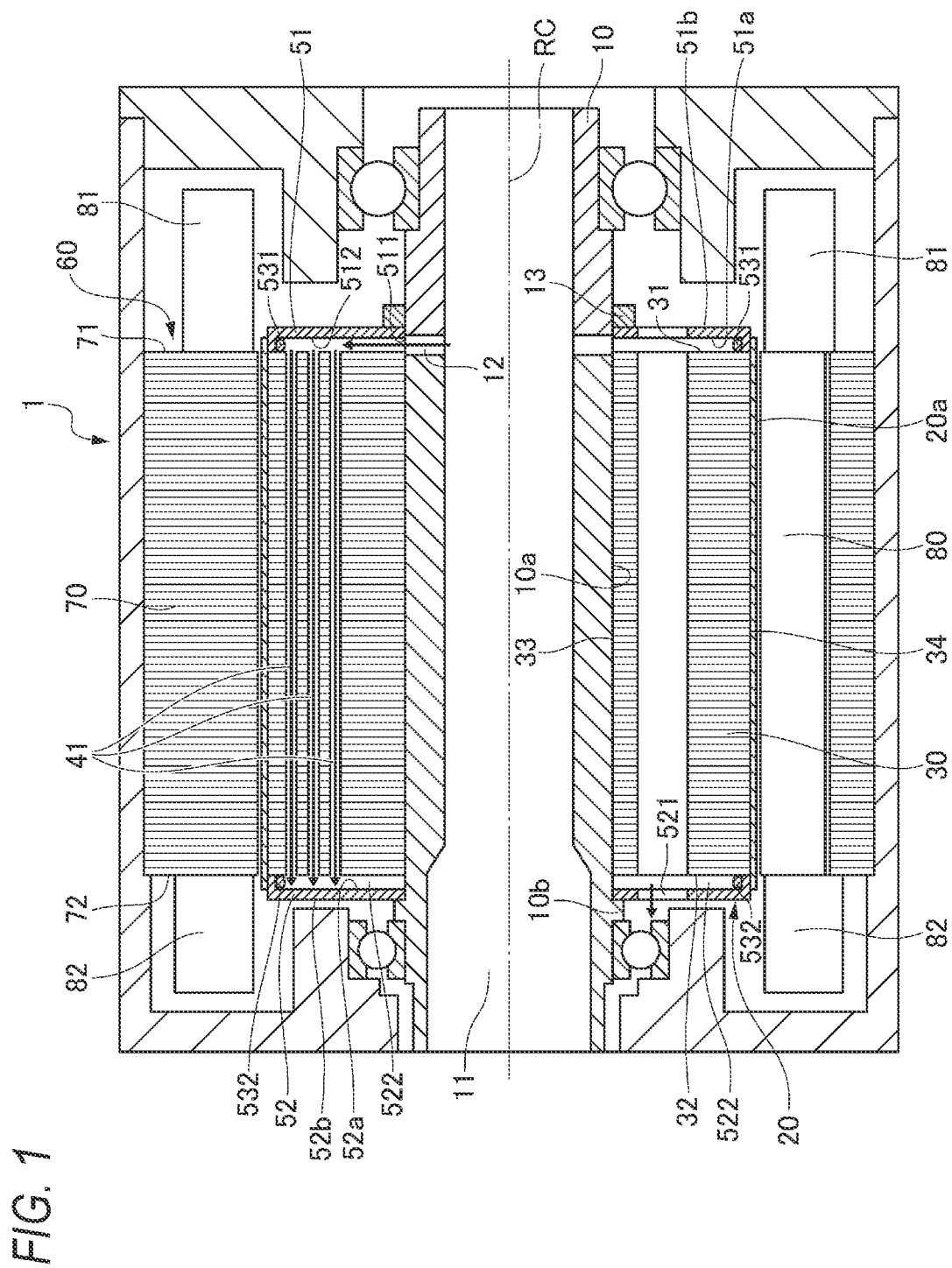
FIG. 1 is a schematic side sectional view of a rotary electric machine according to an embodiment of the present invention.

Hereinafter, an embodiment of a rotary electric machine including a rotor for a rotary electric machine according to the present invention will be described with reference to the accompanying drawings. The drawings are viewed in directions of reference numerals.

(Overall Configuration of Rotary Electric Machine)

As shown in FIG. 1, a rotary electric machine 1 according to the present embodiment includes: a rotor shaft 10 whose rotation axis is a rotation axis RC; a rotor 20 that is fixed to an outer circumferential surface 10a of the rotor shaft 10, has a substantially annular shape centered on the rotation axis RC, and rotates integrally with the rotor shaft 10; and a stator 60 arranged to surround an outer circumferential surface 20a of the rotor 20.

The rotor shaft 10 is a hollow shaft, and a coolant flow path 11 through which a coolant flows is provided in a hollow portion of the rotor shaft 10. The coolant flow path 11 extends in an axial direction inside the rotor shaft 10, and is configured such that the coolant can be supplied from outside. As the coolant, for example, automatic transmission fluid (ATF) is used. A coolant introduction path 12 is formed in the rotor shaft 10 so as to radially penetrate from the coolant flow path 11 to the outer circumferential surface. The coolant flow path 11 is connected to a coolant supply device (not shown) provided outside the rotary electric machine 1.

The rotor 20 includes: a rotor core 30 in which a plurality of magnetic pole portions 40 are formed at predetermined intervals in a circumferential direction, the rotor core 30 having a substantially annular shape centered on the rotation axis RC; a first end surface plate 51 arranged on one side in the axial direction of the rotor core 30; and a second end surface plate 52 arranged on the other side in the axial direction.

The rotor core 30 is formed by laminating a plurality of substantially annular electromagnetic steel plates having the same shape in the axial direction. The rotor core 30 includes: a first end surface 31 facing the first end surface plate 51 on the one side in the axial direction; a second end surface 32 facing the second end surface plate 52 on the other side in the axial direction; a substantially circular inner circumferential surface 33 centered on the rotation axis RC as viewed in the axial direction; and a substantially circular outer circumferential surface 34 that is centered on the rotation axis RC and has a larger diameter than the inner circumferential surface 33. The rotor shaft 10 is fastened and fixed to the inner circumferential surface 33 by press fitting, shrink fitting, cool fitting, or the like.

Each magnetic pole portion 40 includes: a magnet insertion hole 41 that penetrates the rotor core 30 in the axial direction and extends parallel to the rotation axis RC; and a permanent magnet 42 that is inserted into the magnet insertion hole 41.

Each of the first end surface plate 51 and the second end surface plate 52 has a substantially annular shape that is substantially the same as that of the rotor core 30 when viewed in the axial direction. In the axial direction, the first end surface plate 51 is arranged to face the first end surface 31 of the rotor core 30, and the second end surface plate 52 is arranged to face the second end surface 32 of the rotor core 30.

The first end surface plate 51 has an axially inner surface 51a that faces the first end surface 31 of the rotor core 30 in the axial direction, and an axially outer surface 51b that is located on a side opposite to the axially inner surface 51a. The axially inner surface 51a of the first end surface plate 51 is abutted against the first end surface 31 of the rotor core 30. The axially outer surface 51b of the first end surface plate 51 is abutted against a collar 13 arranged on the outer circumferential surface 10a of the rotor shaft 10. The collar 13 is fixed to the outer circumferential surface 10a of the rotor shaft 10 by press fitting or the like.

An annular groove 511 that communicates with the coolant introduction path 12 provided in the rotor shaft 10 is formed in a radially inner end portion in the axially inner surface 51a of the first end surface plate 51. Further, the axially inner surface 51a of the first end surface plate 51 is provided with a plurality of introduction grooves 512 through which the annular groove 511 and the magnet insertion hole 41 provided in the rotor core 30 communicate with each other. The plurality of introduction grooves 512 extend radially outward from the annular groove 511 toward the magnet insertion hole 41.

A ring-shaped O-ring 531 centered on the rotation axis RC is provided between the first end surface 31 of the rotor core 30 and the axially inner surface 51a of the first end surface plate 51.

The second end surface plate 52 has an axially inner surface 52a that faces the second end surface 32 of the rotor core 30 in the axial direction, and an axially outer surface 52b that is located on a side opposite to the axially inner surface 52a. The axially inner surface 52a of the second end surface plate 52 is abutted against the second end surface 32 of the rotor core 30. The axially outer surface 52b of the second end surface plate 52 is abutted against a flange portion 10b of the rotor shaft 10. The flange portion 10b has a substantially annular shape that extends radially outward from the outer circumferential surface 10a of the rotor shaft 10.

The collar 13 presses the first end surface plate 51, the rotor core 30, and the second end surface plate 52 from the one side in the axial direction to the other side in the axial direction. As a result, the rotor 20 is held by the collar 13 and the flange portion lob of the rotor shaft 10, and is fixed to the rotor shaft 10 in the axial direction.

The second end surface plate 52 is provided with a plurality of discharging holes 521 that penetrate in the axial direction along the circumferential direction in the radial direction. A plurality of discharging grooves 522 that communicate the magnet insertion hole 41 provided in the rotor core 30 with each discharging hole 521 are provided in the axially inner surface of the second end surface plate 52.

A ring-shaped O-ring 532 centered on the rotation axis RC is provided between the second end surface 32 of the rotor core 30 and the axially inner surface 52a of the second end surface plate 52.

The stator 60 is arranged so as to face the outer circumferential surface 20a of the rotor 20 at a predetermined interval in the radial direction. The stator 60 includes a substantially annular stator core 70 and a coil 80 attached to the stator core 70.

The stator core 70 is formed by laminating a plurality of substantially annular electromagnetic steel plates in the axial direction. The stator core 70 has a first end surface 71 that is an end surface located on the one side in the axial direction (the side of the first end surface 31 of the rotor core 30) and a second end surface 72 that is an end surface located on the other side in the axial direction (the side of the second end surface 32 of the rotor core 30). An axial position of the first end surface 71 of the stator core 70 is substantially the same as that of the first end surface 31 of the rotor core 30, and an axial position of the second end surface 72 of the stator core 70 is substantially the same as that of the second end surface 32 of the rotor core 30.

The coil 80 includes a first coil end portion 81 that protrudes forward from the first end surface 71 of the stator core 70, and a second coil end portion 82 that protrudes rearward from the second end surface 72 of the stator core 70. Therefore, the first coil end portion 81 protrudes axially outward as compared with the first end surface 31 of the rotor core 30, and the second coil end portion 82 protrudes axially outward as compared with the second end surface 32 of the rotor core 30.

(Coolant Flow Path)

The coolant supplied from the outside to the coolant flow path 11 of the rotor shaft 10 is introduced from the coolant introduction path 12 into the magnet insertion hole 41 formed in the rotor core 30 via the annular groove 511 and the introduction groove 512 of the first end surface plate 51. The coolant introduced into the magnet insertion hole 41 flows inside the magnet insertion hole 41 from the first end surface 31 to the second end surface 32 of the rotor core 30 so as to cool the permanent magnet 42. The coolant that cools the permanent magnet 42 and reaches the second end surface 32 of the rotor core 30 is discharged from the discharging hole 521 via the discharging groove 522 of the second end surface plate 52. When the rotary electric machine is driven, since the rotor 20 is rotated, the coolant discharged from the discharging hole 521 is discharged radially outward due to a centrifugal force of the rotated rotor 20.

(Shape of Magnetic Pole Portion)

Figure 2:
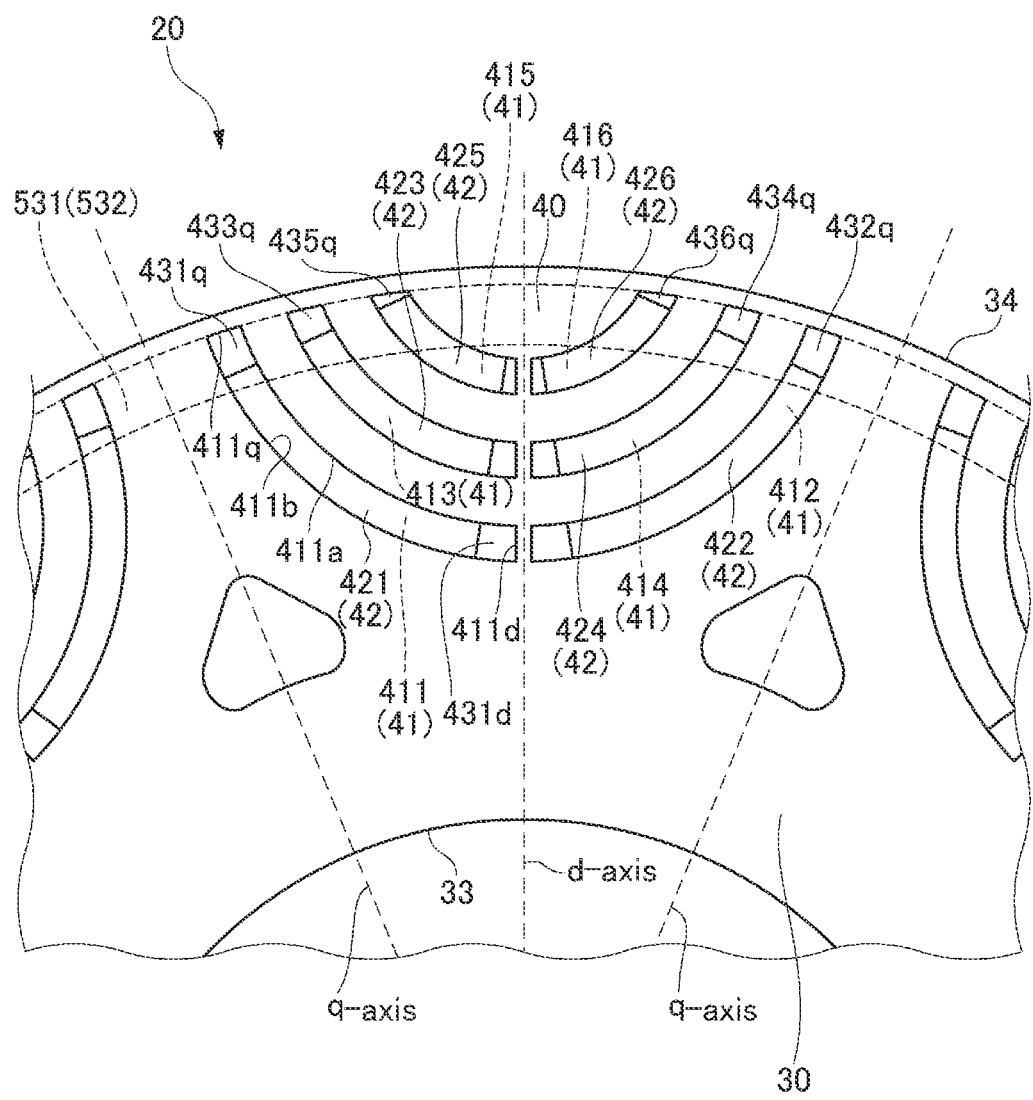
FIG. 2 is an enlarged view of one magnetic pole portion of a rotor for the rotary electric machine shown in FIG. 1.

As shown in FIG. 2, when the rotation axis RC and a center of each magnetic pole portion 40 is connected, a central axis of each magnetic pole portion 40 is referred to as a d-axis (d-axis in the drawing) and an axis that is separated by an electric angle of 90 degrees relative to the d-axis is referred to as a q-axis (q-axis in the drawing), the magnet insertion hole 41 of each magnetic pole portion 40 includes: a first magnet insertion hole 411 that is formed on one side in the circumferential direction (counterclockwise side in FIG. 2) relative to the d-axis when viewed in the axial direction, extends in the circumferential direction as going radially outward from the d-axis to the q-axis, and has a substantially arc shape protruding toward the radially inner side; and a second magnet insertion hole 412 that is formed on the other side in the circumferential direction (clockwise side in FIG. 2) relative to the d-axis, extends in the circumferential direction as going radially outward from the d-axis to the q-axis, has a substantially arc shape protruding toward the radially inner side, and has a shape symmetrical to the first magnet insertion hole 411 relative to the d-axis.

Further, the magnet insertion hole 41 of each magnetic pole portion 40 includes: a third magnet insertion hole 413 that is formed on the one side in the circumferential direction (counterclockwise side in FIG. 2) relative to the d-axis when viewed in the axial direction, located on a radially outer side relative to the first magnet insertion hole 411, extends in the circumferential direction as going radially outward from the d-axis to the q-axis, and has a substantially arc shape protruding radially inward; and a fourth magnet insertion hole 414 that is formed on the other side in the circumferential direction (clockwise side in FIG. 2) relative to the d-axis, located on the radially outer side relative to the second magnet insertion hole 412, extends in the circumferential direction as going radially outward from the d-axis to the q-axis, has a substantially arc shape protruding radially inward, and has a shape symmetrical to the third magnet insertion hole 413 relative to the d-axis.

Further, the magnet insertion hole 41 of each magnetic pole portion 40 includes: a fifth magnet insertion hole 415 that is formed on the one side in the circumferential direction (counterclockwise side in FIG. 2) relative to the d-axis when viewed in the axial direction, located on a radially outer side relative to the third magnet insertion hole 413, extends radially outward in the circumferential direction from the d-axis side to the q-axis side, and has a substantially arc shape protruding radially inward; and a sixth magnet insertion hole 416 that is formed on the other side in the circumferential direction (clockwise side in FIG. 2) relative to the d-axis, located on the radially outer side relative to the fourth magnet insertion hole 414, extends in the circumferential direction as going radially outward from the d-axis to the q-axis, has a substantially arc shape protruding radially inward, and has a shape symmetrical to the fifth magnet insertion hole 415 relative to the d-axis.

The permanent magnet 42 of each magnetic pole portion 40 includes: a substantially arc-shaped first permanent magnet 421 that is inserted into the first magnet insertion hole 411 and is arranged to protrude radially inward; a substantially arc-shaped second permanent magnet 422 that is inserted into the second magnet insertion hole 412 and is arranged to protrude radially inward; a substantially arc-shaped third permanent magnet 423 that is inserted into the third magnet insertion hole 413 and is arranged to protrude radially inward; a substantially arc-shaped fourth permanent magnet 424 that is inserted into the fourth magnet insertion hole 414 and is arranged to protrude radially inward; a substantially arc-shaped fifth permanent magnet 425 that is inserted into the fifth magnet insertion hole 415 and is arranged to protrude radially inward; and a substantially arc-shaped sixth permanent magnet 426 that is inserted into the sixth magnet insertion hole 416 and is arranged to protrude radially inward.

The permanent magnet 42 of each magnetic pole portion 40, that is, the first permanent magnet 421 to the sixth permanent magnet 426 are magnetized in the radial direction. In addition, the permanent magnets 42, that is, the first permanent magnet 421 to the sixth permanent magnet 426 are arranged such that magnetization directions of adjacent magnetic pole portions 40 are different from each other, and magnetization directions of the magnetic pole portions 40 are alternately different from each other in the circumferential direction.

When viewed in the axial direction, the first magnet insertion hole 411 includes: an outer-diameter-side wall surface 411a that has a substantially arc shape whose arc center is located on the d-axis on a radially outer side relative to the rotor core 30 and extends in the circumferential direction on the one side in the circumferential direction (counterclockwise side in FIG. 2) relative to the d-axis; an inner-diameter-side wall surface 411b that has a substantially arc shape whose arc center is the same as the outer-diameter-side wall surface 411a, faces the outer-diameter-side wall surface 411a on a radially inner side, and extends in the circumferential direction on the one side in the circumferential direction (counterclockwise side in FIG. 2) relative to the d-axis; a d-axis-side end portion 411d that connects an end portion on the d-axis side of the outer-diameter-side wall surface 411a and an end portion on the d-axis side of the inner-diameter-side wall surface 411b; and a q-axis-side end portion 411q that connects an end portion on the q-axis side of the outer-diameter-side wall surface 411a and an end portion on the q-axis side of the inner-diameter-side wall surface 411b. The outer-diameter-side wall surface 411a and the inner-diameter-side wall surface 411b of the first magnet insertion hole 411 extend in a substantially arc shape such that the end portion on the q-axis side is located in the vicinity of the outer circumferential surface 34 of the rotor core 30.

The first permanent magnet 421 includes: an outer-diameter-side end surface 421a that faces the outer-diameter-side wall surface 411a of the first magnet insertion hole 411 inside the first magnet insertion hole 411, and extends in the circumferential direction; an inner-diameter-side end surface 421b that faces the inner-diameter-side wall surface 411b of the first magnet insertion hole 411 inside the first magnet insertion hole 411 and extends in the circumferential direction; a d-axis-side end portion 421d that connects the outer-diameter-side end surface 421a and the inner-diameter-side end surface 421b at an end portion on the d-axis side in the circumferential direction; and a q-axis-side end portion 421q that connects the outer-diameter-side end surface 421a and the inner-diameter-side end surface 421b at an end portion on the q-axis side in the circumferential direction.

A d-axis-side space portion 431d that penetrates in the axial direction is formed inside the first magnet insertion hole 411 between the d-axis-side end portion 421d of the first permanent magnet 421 and the d-axis-side end portion 411d of the first magnet insertion hole 411. The d-axis-side space portion 431d includes a first opening portion 431d1 that is opened in the first end surface 31 of the rotor core 30, and a second opening portion 431d2 that is opened in the second end surface 32 of the rotor core 30 (see FIG. 3).

A q-axis-side space portion 431q that penetrates in the axial direction is formed inside the first magnet insertion hole 411 between the q-axis side end portion 421q of the first permanent magnet 421 and the q-axis side end portion 411q of the first magnet insertion hole 411. The q-axis-side space portion 431q includes a first opening portion 431q1 that is opened in the first end surface 31 of the rotor core 30, and a second opening portion 431q2 that is opened in the second end surface 32 of the rotor core 30.

The q-axis-side space portion 431q of the first magnet insertion hole 411 is covered with the O-ring 531 on the first end surface 31 of the rotor core 30. Similarly, the q-axis-side space portion 431q of the first magnet insertion hole 411 is covered with the O-ring 532 on the second end surface 32 of the rotor core 30.

Figure 3:
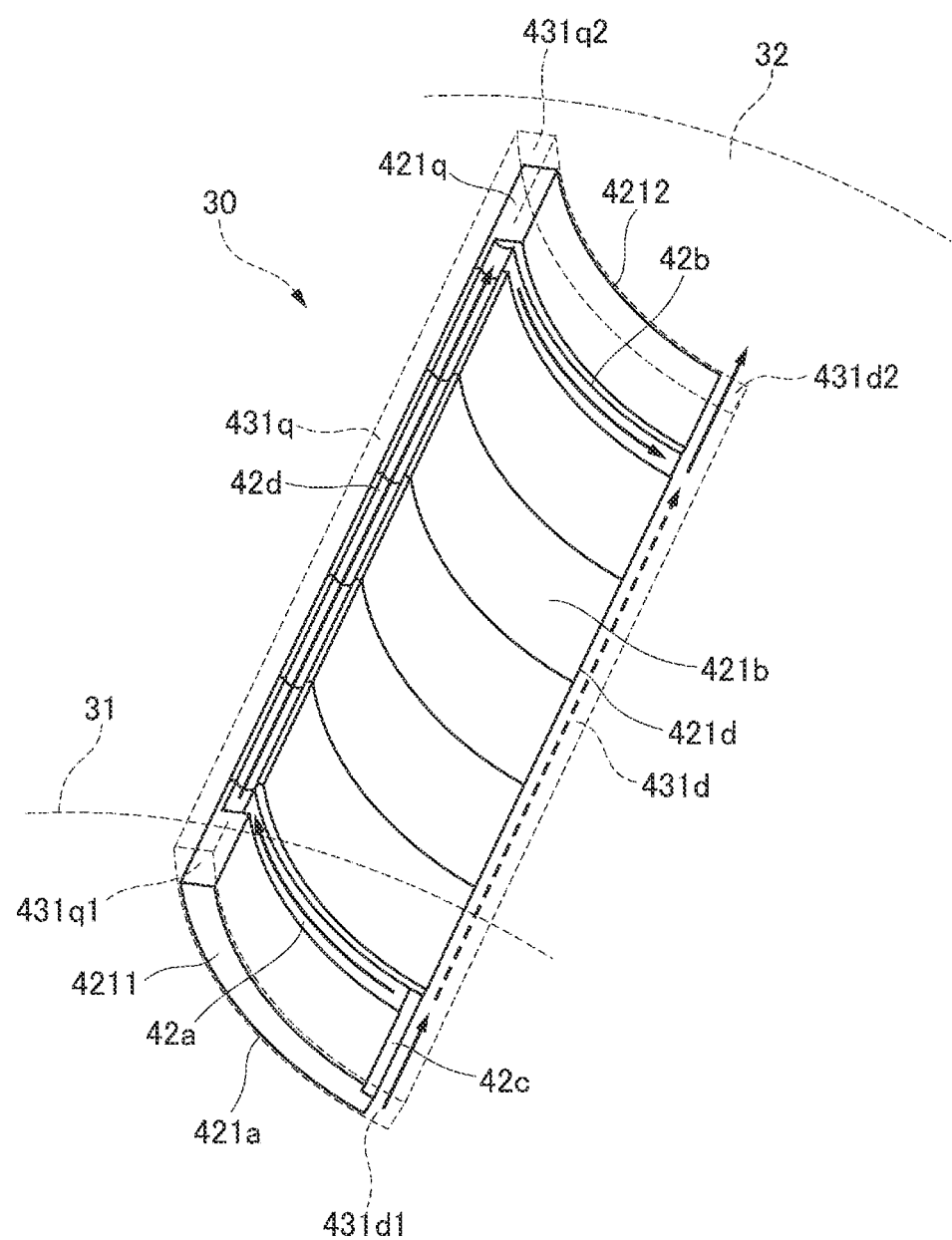
FIG. 3 is an exploded perspective view showing a first magnet insertion hole and a first permanent magnet of the rotor for the rotary electric machine shown FIG. 1, and a flow of a coolant inside the first magnet insertion hole.

As shown in FIG. 3, the first permanent magnet 421 is formed with a first communication portion 42a that communicates the d-axis-side end portion 421d with the q-axis-side end portion 421q at a position separated by a predetermined distance in the axial direction from a first end portion 4211 on the one side in the axial direction. In the present embodiment, the first communication portion 42a is a groove portion that is formed in the inner-diameter-side end surface 421b of the first permanent magnet 421 and extends from the d-axis-side end portion 421d to the q-axis-side end portion 421q.

The first permanent magnet 421 is formed with a second communication portion 42b that communicates the d-axis-side end portion 421d with the q-axis-side end portion 421q at a position separated by a predetermined distance in the axial direction from a second end portion 4212 on the other side in the axial direction. In the present embodiment, the second communication portion 42b is a groove portion that is formed in the inner-diameter-side end surface 421b of the first permanent magnet 421 and extends from the d-axis-side end portion 421d to the q-axis-side end portion 421q.

A third communication portion 42c that extends in the axial direction from the first end portion 4211 to the first communication portion 42a is formed in the d-axis-side end portion 421d of the first permanent magnet 421. In the present embodiment, the third communication portion 42c is a groove portion that is formed in the d-axis-side end portion 421d of the first permanent magnet 421 and extends in the axial direction from the first end portion 4211 to the first communication portion 42a.

A fourth communication portion 42d that extends in the axial direction from the first communication portion 42a to the second communication portion 42b is formed in the q-axis-side end portion 421q of the first permanent magnet 421. In the present embodiment, the fourth communication portion 42d is a groove portion that is formed in the q-axis-side end portion 421q of the first permanent magnet 421 and extends in the axial direction from the first communication portion 42a to the second communication portion 42b.

(Flow of Coolant Inside Magnet Insertion Hole)

The coolant supplied from the outside to the coolant flow path 11 of the rotor shaft 10 is introduced from the coolant introduction path 12 into the first magnet insertion hole 411 formed in the rotor core 30 via the annular groove 511 and the introduction groove 512 of the first end surface plate 51.

The coolant introduced into the first magnet insertion hole 411 is introduced into the d-axis-side space portion 431d from the first opening portion 431d1 of the d-axis-side space portion 431d. A part of the coolant introduced into the d-axis-side space portion 431d is supplied to the q-axis-side space portion 431q through the first communication portion 42a of the first permanent magnet 421, and the rest of the coolant flows in the axial direction through the d-axis-side space portion 431d and is discharged from the second opening portion 431d2 of the d-axis-side space portion 431d.

The coolant supplied from the d-axis-side space portion 431d to the q-axis-side space portion 431q through the first communication portion 42a of the first permanent magnet 421 flows through the q-axis-side space portion 431q to the other side in the axial direction, then is supplied again to the d-axis-side space portion 431d through the second communication portion 42b of the first permanent magnet 421 and is discharged from the second opening portion 431*d*2 of the d-axis-side space portion 431*d*.

Therefore, since the first permanent magnet 421 is formed with the first communication portion 42*a* that communicates the d-axis-side end portion 421*d* with the q-axis-side end portion 421*q*, the coolant can be introduced in the first magnet insertion hole 411 from the d-axis-side space portion 431*d* formed on the radially inner side, and the coolant can be supplied through the first communication portion 42*a* to the q-axis-side space portion 431*q* formed on the radially outer side. As a result, a radially outer region, which is most likely to generate heat, of the first permanent magnet 421 can be effectively cooled.

Further, since the first permanent magnet 421 is formed with the second communication portion 42*b* that communicates the d-axis-side end portion 421*d* with the q-axis-side end portion 421*q*, in the first magnet insertion hole 411, the coolant supplied to the q-axis-side space portion 431*q* can be supplied again from the second communication portion 42*b* to the d-axis-side space portion 431*d* formed on the radially inner side, and can be discharged from the second opening portion 431*d*2 of the d-axis-side space portion 431*d*. As a result, the coolant discharged from the first magnet insertion hole 411 can be prevented from flowing between the rotor 20 and the stator 60, and thus friction during rotation of the rotor 20 of the rotary electric machine 1 is reduced.

At this time, the first communication port on 42*a* is the groove portion that is formed in the inner-diameter-side end surface 421*b* of the first permanent magnet 421 and extends from the d-axis-side end portion 421*d* to the q-axis-side end portion 421*q*, and the second communication portion 42*b* is the groove portion that is formed in the inner-diameter-side end surface 421*b* of the first permanent magnet 421 and extends from the d-axis-side end portion 421*d* to the q-axis-side end portion 421*q*, so that the first communication portion 42*a* and the second communication portion 42*b* can be easily formed.

Further, since the third communication portion 42*c* that extends in the axial direction from the first end portion 4211 to the first communication portion 42*a* is formed in the d-axis-side end portion 421*d* of the first permanent magnet 421, a larger amount of the coolant can be supplied to the first communication portion 42*a*. As a result, the coolant can he supplied from the third communication portion 42*c* to the first communication portion 42*a*, and a larger amount of the coolant can be supplied to the q-axis-side space portion 431*q* formed on the radially outer side, so that the radially outer region, which is most likely to generate heat, of the first permanent magnet 421 can be effectively cooled.

Since the fourth communication portion 42*d* that extends in the axial direction from the first communication portion 42*a* to the second communication portion 42*b* is formed in the q-axis-side end portion 421*q* of the first permanent magnet 421, a flow rate of the coolant flowing through the q-axis-side end portion 421*q* of the first permanent magnet 421 can be increased. As a result, the radially outer region, which is most likely to generate heat, of the first permanent magnet 421 can be more effectively cooled.

Since the q-axis-side space portion 431*q* of the first magnet insertion hole 411 is covered with the O-ring 531 on the first end surface 31 of the rotor core 30 and is covered with the O-ring 532 on the second end surface 32 of the rotor core 30, the coolant introduced into the first magnet insertion hole 411 is not discharged from the q-axis-side space portion 431*q* formed on the radially outer side. As a result, the coolant discharged from the first magnet insertion hole 411 can be more reliably prevented from flowing between the rotor 20 and the stator 60.

Even though the q-axis-side space portion 431*q* of the first magnet insertion hole 411 is covered with the O-ring 531 on the first end surface 31 of the rotor core 30 and is covered with the O-ring 532 on the second end surface 32 of the rotor core 30, since the first permanent magnet 421 is formed with the first communication portion 42*a* that communicates the d-axis-side end portion 421*d* with the q-axis-side end portion 421*q*, the coolant can be introduced in the first magnet insertion hole 411 from the d-axis-side space portion 431*d* formed on the radially inner side, and the coolant can be supplied through the first communication portion 42*a* to the q-axis-side space portion 431*q* formed on the radially outer side. As a result, the radially outer region, which is most likely to generate heat, of the first permanent magnet 421 can be effectively cooled while the coolant discharged from the first magnet insertion hole 411 can be prevented from flowing between the rotor 20 and the stator 60.

The second magnet insertion hole 412 has a shape that is symmetrical to the first magnet insertion hole 411 relative to the d-axis, and the second permanent magnet 422 has a shape that is symmetrical to the first permanent magnet 421 relative to the d-axis. Similarly to the first permanent magnet 421, the second permanent magnet 422 includes the first communication portion 42*a*, the second communication portion 42*b*, the third communication portion 42*c*, and the fourth communication portion 42*d*. A q-axis-side space portion 432*q* of the second magnet insertion hole 412 is also covered with the O-ring 531 on the first end surface 31 of the rotor core 30, and is also covered with the O-ring 532 on the second end surface 32 of the rotor core 30.

The third magnet insertion hole 413 has a diameter smaller than that of the first magnet insertion hole 411 and has a shape substantially similar to that of the first magnet insertion hole 411 on the radially outer side of the first magnet insertion hole 411. The third permanent magnet 423 has a diameter smaller than that of the first permanent magnet 421 and has a shapes substantially similar to that of the first permanent magnet 421. Similarly to the first permanent magnet 421, the third permanent magnet 423 includes the first communication portion 42*a*, the second communication portion 42*b*, the third communication portion 42*c*, and the fourth communication portion 42*d*. A q-axis-side space portion 433*q* of the third magnet insertion hole 413 is also covered with the O-ring 531 on the first end surface 31 of the rotor core 30, and is also covered with the O-ring 532 on the second end surface 32 of the rotor core 30.

The fourth magnet insertion hole 414 has a shape that is symmetrical to the third magnet insertion hole 413 relative to the d-axis, and the fourth permanent magnet 424 has a shape that is symmetrical to the third permanent magnet 423 relative to the d-axis. Similarly to the first permanent magnet 421, the fourth permanent magnet 424 includes the first communication portion 42*a*, the second communication portion 42*b*, the third communication portion 42*c*, and the fourth communication portion 42*d*. A q-axis-side space portion 434*q* of the fourth magnet insertion hole 414 is also covered with the O-ring 531 on the first end surface 31 of the rotor core 30, and is also covered with the O-ring 532 on the second end surface 32 of the rotor core 30.

The fifth magnet insertion hole 415 has a diameter smaller than that of the third magnet insertion hole 413 and has a shape substantially similar to that of the first magnet insertion hole 411 on the radially outer side of the third magnet insertion hole 413. The fifth permanent magnet 425 has a diameter smaller than that of the third permanent magnet 423 and has a shape substantially similar to that of the first permanent magnet 421. Similarly to the first permanent magnet 421, the fifth permanent magnet 425 includes the first communication portion 42a, the second communication portion 42b, the third communication portion 42c, and the fourth communication portion 42d. A q-axis-side space portion 435q of the fifth magnet insertion hole 415 is also covered with the O-ring 531 on the first end surface 31 of the rotor core 30, and is also covered with the O-ring 532 on the second end surface 32 of the rotor core 30.

The sixth magnet insertion hole 416 has a shape that is symmetrical to the fifth magnet insertion hole 415 relative to the d-axis, and the sixth permanent magnet 426 has a shape that is symmetrical to the fifth permanent magnet 425 relative to the d-axis. Similarly to the first permanent magnet 421, the sixth permanent magnet 426 includes the first communication portion 42a, the second communication portion 42b, the third communication portion 42c, and the fourth communication portion 42d. A q-axis-side space portion 436q of the sixth magnet insertion hole 416 is also covered with the O-ring 531 on the first end surface 31 of the rotor core 30, and is also covered with the O-ring 532 on the second end surface 32 of the rotor core 30.

Although one embodiment of the present invention has been described above with reference to the accompanying drawings, it is needless to say that the present invention is not limited to such an embodiment. It will be apparent to those skilled in the art that various changes and modifications may be conceived within the scope of the claims. It is also understood that the various changes and modifications belong to the technical scope of the present invention. Constituent elements in the embodiments described above may be combined freely within a range not departing from a spirit of the invention.

For example, in the present embodiment, the first communication portion 42a is the groove portion that is formed in the inner-diameter-side end surface 421b of the first permanent magnet 421, and the second communication portion 42b is the groove portion that is formed in the inner-diameter-side end surface 421b of the first permanent magnet 421. However, both or one of the first communication portion 42a and the second communication portion 42b may be formed on the outer-diameter-side end surface 421a of the first permanent magnet 421, or the first communication portion 42a and the second communication portion 42b may be formed both on the outer-diameter-side end surface 421a and the inner-diameter-side end surface 421b of the first permanent magnet 421.

For example, in the present embodiment, the first communication portion 42a is the groove portion that is formed in the inner-diameter-side end surface 421b of the first permanent magnet 421, and the second communication portion 42b is the groove portion that is formed in the inner-diameter-side end surface 421b of the first permanent magnet 421. However, bath or one of the first communication portion 42a and the second communication portion 42b may be a through hole that penetrates from the d-axis-side end portion 421d to the q-axis-side end portion 421q.

For example, in the present embodiment, the third communication portion 42c is the groove portion that is formed in the d-axis-side end portion 421d of the first permanent magnet 421 and extends in the axial direction from the first end portion 4211 to the first communication portion 42a. However, the third communication portion 42c may be a communication hole that extends in the axial direction from the first end portion 4211 to the first communication portion 42a at a position separated by a predetermined distance in the circumferential direction from the d-axis-side end portion 421d of the first permanent magnet 421.

At least the following matters are described in the present specification. in the parentheses, the corresponding constituent elements and the like in the above-described embodiment are shown as an example, but the present invention is not limited thereto.

(1) A rotor (rotor 20) for a rotary electric machine includes: a rotor core (rotor core 30) having a substantially annular shape in which a plurality of magnetic pole portions (magnetic pole portions 40) are provided at predetermined intervals in a circumferential direction.

Each of the magnetic pole portions includes: at least one magnet insertion hole (first magnet insertion hole 411) that penetrates the rotor core in an axial direction, a permanent magnet (first permanent magnet 421) that is inserted into the magnet insertion hole, a central axis referred to as a d-axis, and an axis referred to as a q-axis that is separated from the d-axis by an electric angle of 90 degrees.

When viewed from the axial direction, the magnet insertion hole is formed on a side of the magnetic pole portion in the circumferential direction relative to the d-axis, extends in the circumferential direction as going radially outward from the d-axis to the q-axis, and includes: an outer-diameter-side wall surface (outer-diameter-side wall surface 411a) extending in the circumferential direction; an inner-diameter-side wall surface (inner-diameter-side wall surface 411b) extending in the circumferential direction so as to face the outer-diameter-side wall surface from a radially inner side; a d-axis-side end portion (d-axis-side end portion 411d) connecting the outer-diameter-side wall surface and the inner-diameter-side wall surface at an end portion on the d-axis side in the circumferential direction; and a q-axis-side end portion (q-axis-side end portion 411q) connecting the outer-diameter-side wall surface and the inner-diameter-side wall surface at an end portion on the q-axis side in the circumferential direction.

The permanent magnet includes: an outer-diameter-side end surface (outer-diameter-side end surface 421a) facing the outer-diameter-side wall surface of the magnet insertion hole and extending in the circumferential direction inside the magnet insertion hole; an inner-diameter-side end surface (inner-diameter-side end surface 421b) facing the inner-diameter-side wall surface of the magnet insertion hole and extending in the circumferential direction inside the magnet insertion hole; a d-axis-side end portion (d-axis-side end portion 421d) connecting the outer-diameter-side end surface and the inner-diameter-side end surface at an end portion on the d-axis side in the circumferential direction; and a q-axis-side end portion (q-axis-side end portion 421q) connecting the outer-diameter-side end surface and the inner-diameter-side end surface at an end portion on the q-axis side in the circumferential direction.

A d-axis-side space portion (d-axis-side space portion 431d) penetrating in the axial direction is formed inside the magnet insertion hole between the d-axis-side end portion of the permanent magnet and the d-axis-side end portion of the magnet insertion hole.

A q-axis-side space portion (q-axis-side space portion 431q) penetrating in the axial direction is formed inside the magnet insertion hole between the q-axis-side end portion of the permanent magnet and the q-axis-side end portion of the magnet insertion hole.

The permanent magnet further includes: a first communication portion (first communication portion 42a) provided at a predetermined distance from a first end portion (first end portion 4211) on one side in the axial direction toward a center in the axial direction, the first communication portion being configured to communicate the d-axis-side end portion with the q-axis-side end portion; and a second communication portion (second communication portion 42*b*) provided at a predetermined distance from a second end portion (second end portion 4212) on the other side in the axial direction toward the center in the axial direction, the second communication portion being configured to communicate the d-axis-side end portion with the q-axis-side end portion.

The d-axis-side space portion includes: a first opening portion (first opening portion 431*d*1) opened in a first end surface (first end surface 31) on the one side in the axial direction of the rotor core; and a second opening portion (second opening portion 431*d*2) opened in a second end surface (second end surface 32) on the other side in the axial direction of the rotor core, and a coolant is introduced from the first opening portion of the d-axis-side space portion into the d-axis-side space portion, at least a part of the coolant is supplied to the q-axis-side space portion through the first communication portion to flow to the other side in the axial direction, supplied again to the d-axis-side space portion through the second communication portion, and discharged from the second opening portion of the d-axis-side space portion.

According to (1), since the permanent magnet is formed with the first communication portion that communicates the d-axis-side end portion with the q-axis-side end portion, the coolant can be introduced in the magnet insertion hole from the d-axis-side space portion formed on the radially inner side, and the coolant can be supplied through the first communication portion to the q-axis-side space portion formed on the radially outer side. As a result, a radially outer region, which is most likely to generate heat, of the permanent magnet can be effectively cooled.

Further, since the permanent magnet is formed with the second communication portion that communicates the d-axis-side end portion with the q-axis-side end portion, in the magnet insertion hole, the coolant supplied to the q-axis-side space portion can be supplied again from the second communication portion to the d-axis-side space portion formed on the radially inner side, and can be discharged from the second opening portion of the d-axis-side space portion. As a result, the coolant discharged from the magnet insertion hole can be prevented from flowing between the rotor and the stator, and thus friction during rotation of the rotor for the rotary electric machine is reduced.

(2) The rotor according to (1), in which the first communication portion is a groove portion that is formed in at least one of the inner-diameter-side end surface and the outer-diameter-side end surface of the permanent magnet and extends from the d-axis-side end portion to the q-axis-side end portion, and the second communication portion is a groove portion that is formed in at least one of the inner-diameter-side end surface and the outer-diameter-side end surface of the permanent magnet and extends from the d-axis-side end portion to the q-axis-side end portion.

According to (2), the first communication portion is the groove portion that is formed in at least one of the inner-diameter-side end surface and the outer-diameter-side end surface of the permanent magnet and extends from the d-axis-side end portion to the q-axis-side end portion, and the second communication portion is the groove portion that is formed in at least one of the inner-diameter-side end surface and the outer-diameter-side end surface of the permanent magnet and extends from the d-axis-side end portion to the q-axis-side end portion, so that the first communication portion and the second communication portion can be easily formed.

(3) The rotor according to (1) or (2), in which a third communication portion (third communication portion 42*c*) extending in the axial direction from the first end portion to the first communication portion is provided in the d-axis-side end portion of the permanent magnet.

According to (3), since the third communication portion that extends in the axial direction from the first end portion to the first communication portion is formed in the d-axis-side end portion of the permanent magnet, a larger amount of the coolant can be supplied to the first communication portion. As a result, the coolant can be supplied from the third communication portion to the first communication portion, and a larger amount of the coolant can be supplied to the q-axis-side space portion formed on the radially outer side, so that the radially outer region, which is most likely to generate heat, of the permanent magnet can be effectively cooled.

(4) The rotor according to any one of (1) to (3), in which a fourth communication portion (fourth communication portion 42*d*) extending in the axial direction from the first communication portion to the second communication portion is provided in the q-axis-side end portion of the permanent magnet.

According to (4), since the fourth communication portion that extends in the axial direction from the first communication portion to the second communication portion is formed in the q-axis-side end portion of the permanent magnet, a flow rate of the coolant flowing through the it-axis-side end portion of the permanent magnet can be increased. As a result, the radially outer region, which is most likely to generate heat, of the permanent magnet can be more effectively cooled.

(5) The rotor according to any one of (1) to (4), in which an end surface plate (first end surface plate 51, second end surface plate 52) having a substantially annular shape that has the same center and the same diameter as the rotor core is provided on each of the one side in the axial direction and the other side in the axial direction of the rotor core.

a ring-shaped seal member (O-ring 531, O-ring 532) having the same center as the rotor core is provided between an axial end surface (first end surface 31, second end surface 32) of the rotor core and an axially inner surface (axially inner surfaces 51*a* and 52*a*) of the end surface plate, the axially inner surface facing the axial end surface of the rotor core in the axial direction, and the q-axis-side space portion is covered with the seal member on the axial end surface of the rotor core.

According to (5), since the q-axis-side space portion is covered with the seal member on the axial end surface of the rotor core, the coolant introduced into the magnet insertion hole is not discharged from the q-axis-side space portion formed on the radially outer side. As a result, the coolant discharged from the magnet insertion hole can be more reliably prevented from flowing between the rotor and the stator.

Even though the q-axis-side space portion is covered with the seal member on the axial end surface of the rotor core, since the permanent magnet is formed with the first communication portion that communicates the d-axis-side end portion with the q-axis-side end portion, the coolant can be introduced in the magnet insertion hole from the d-axis-side space portion formed on the radially inner side, and the coolant can be supplied through the first communication portion to the q-axis-side space portion formed on the radially outer side. As a result, the radially outer region, which is most likely to generate heat, of the permanent magnet can be effectively cooled while the coolant discharged from the magnet insertion hole can be prevented from flowing between the rotor and the stator.

What is claimed is:

1. A rotor for a rotary electric machine, comprising:
a rotor core having a substantially annular shape in which a plurality of magnetic pole portions is provided at predetermined intervals in a circumferential direction, wherein
each of the magnetic pole portions includes:
at least one magnet insertion hole that penetrates the rotor core in an axial direction,
a permanent magnet that is inserted into the magnet insertion hole,
a central axis referred to as a d-axis, and
an axis referred to as a q-axis that is separated from the d-axis by an electric angle of 90 degrees,
when viewed from the axial direction, the magnet insertion hole
is formed on a side of the magnetic pole portion in the circumferential direction relative to the d-axis,
extends in the circumferential direction as going radially outward from the d-axis to the q-axis,
and includes: an outer-diameter-side wall surface extending in the circumferential direction; an inner-diameter-side wall surface extending in the circumferential direction so as to face the outer-diameter-side wall surface from a radially inner side; a d-axis-side end portion connecting the outer-diameter-side wall surface and the inner-diameter-side wall surface at an end portion on the d-axis side in the circumferential direction; and a q-axis-side end portion connecting the outer-diameter-side wall surface and the inner-diameter-side wall surface at an end portion on the q-axis side in the circumferential direction,
the permanent magnet includes: an outer-diameter-side end surface facing the outer-diameter-side wall surface of the magnet insertion hole and extending in the circumferential direction inside the magnet insertion hole; an inner-diameter-side end surface facing the inner-diameter-side wall surface of the magnet insertion hole and extending in the circumferential direction inside the magnet insertion hole; a d-axis-side end portion connecting the outer-diameter-side end surface and the inner-diameter-side end surface at an end portion on the d-axis side in the circumferential direction; and a q-axis-side end portion connecting the outer-diameter-side end surface and the inner-diameter-side end surface at an end portion on the q-axis side in the circumferential direction,
a d-axis-side space portion penetrating in the axial direction is provided inside the magnet insertion hole between the d-axis-side end portion of the permanent magnet and the d-axis-side end portion of the magnet insertion hole,
a q-axis-side space portion penetrating in the axial direction is provided inside the magnet insertion hole between the q-axis-side end portion of the permanent magnet and the q-axis-side end portion of the magnet insertion hole,
the permanent magnet further includes: a first communication portion provided at a predetermined distance from a first end portion on one side in the axial direction toward a center in the axial direction, the first communication portion being configured to communicate the d-axis-side end portion with the q-axis-side end portion; and a second communication portion provided at a predetermined distance from a second end portion on the other side in the axial direction toward the center in the axial direction, the second communication portion being configured to communicate the d-axis-side end portion with the q-axis-side end portion,
the d-axis-side space portion includes: a first opening portion opened in a first end surface on the one side in the axial direction of the rotor core, and a second opening portion opened in a second end surface on the other side in the axial direction of the rotor core, and
a coolant is introduced from the first opening portion of the d-axis-side space portion into the d-axis-side space portion, at least a part of the coolant is supplied to the q-axis-side space portion through the first communication portion to flow to the other side in the axial direction, supplied again to the d-axis-side space portion through the second communication portion, and discharged from the second opening portion of the d-axis-side space portion.

2. The rotor according to claim 1, wherein
the first communication portion is a groove portion that is formed in at least one of the inner-diameter-side end surface and the outer-diameter-side end surface of the permanent magnet and extends from the d-axis-side end portion to the q-axis-side end portion, and
the second communication portion is a groove portion that is formed in at least one of the inner-diameter-side end surface and the outer-diameter-side end surface of the permanent magnet and extends from the d-axis-side end portion to the q-axis-side end portion.

3. The rotor according to claim 1, wherein
a third communication portion extending in the axial direction from the first end portion to the first communication portion is provided in the d-axis-side end portion of the permanent magnet.

4. The rotor according to claim 1, wherein
a fourth communication portion extending in the axial direction from the first communication portion to the second communication portion is provided in the q-axis-side end portion of the permanent magnet.

5. The rotor according to claim 1, wherein
an end surface plate having a substantially annular shape that has the same center and the same diameter as the rotor core is provided on each of the one side in the axial direction and the other side in the axial direction of the rotor core,
a ring-shaped seal member having the same center as the rotor core is provided between an axial end surface of the rotor core and an axially inner surface of the end surface plate, the axially inner surface facing the axial end surface of the rotor core in the axial direction, and
the q-axis-side space portion is covered with the seal member on the axial end surface of the rotor core.

* * * * *